Dec. 17, 1968  F. M. BISHOP ET AL  3,416,831
GOLF CUP HOLE CUTTER
Filed July 2, 1965
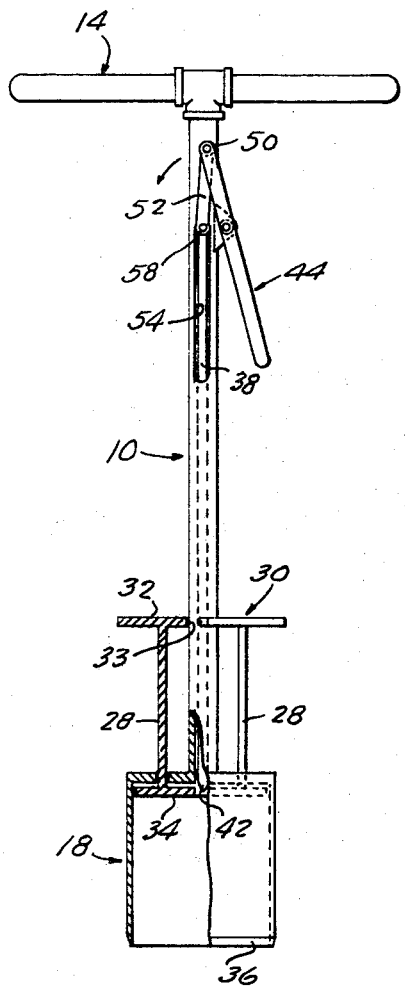
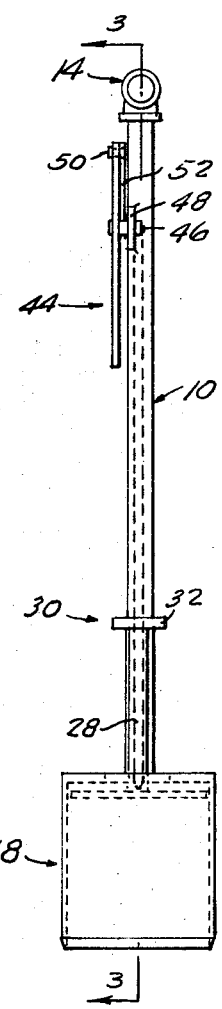
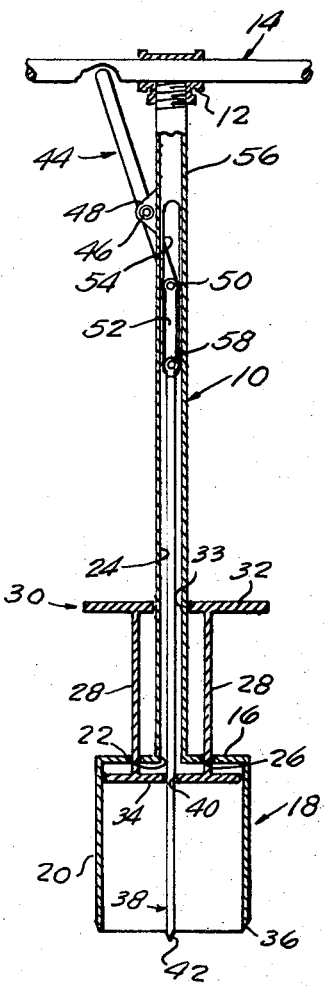
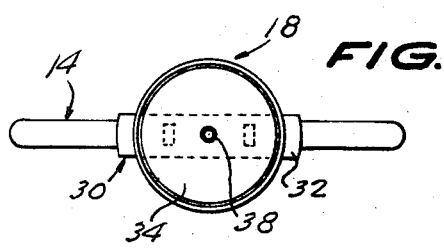
INVENTORS.
FOREST M. BISHOP,
ROY I. BISHOP, JR.
BY
Berman, Davidson + Berman
ATTORNEYS.

United States Patent Office 3,416,831
Patented Dec. 17, 1968

3,416,831
GOLF CUP HOLE CUTTER
Forest M. Bishop and Roy I. Bishop, Jr., both of
Rte. 2, Box 69, Olympia, Wash. 98501
Filed July 2, 1965, Ser. No. 469,180
7 Claims. (Cl. 294—50.5)

ABSTRACT OF THE DISCLOSURE

A hole cutting device for forming golf holes or the like comprising a hollow cup-shaped cutter head having an open lower end and a top wall, an upstanding tubular shaft fixed to said top wall, a vertically elongated rod having a cross-section smaller than that of the shaft throughout its length and working through an opening in the cutter head top wall and within said hollow shaft, manual operative means on the shaft and connected to the rod for moving the rod between a downwardly extended position, wherein the lower end of the rod is below the lower end of the cutter head, and an upwardly retracted position wherein the lower end of the rod is substantially at the level of the top wall of the cutter head, whereby said rod may be extended and retracted to provide a venting hole in a ground plug formed by the cutter head for preventing vacuum suction from hindering removal of the plug from the ground.

---

This invention relates to a soil and turf cutter, and more particularly to a golf cup hole cutter.

The use and operation of conventional cutters of the kind indicated, are accompanied by various drawbacks, such as the tendency of the plugs cut thereby to resist withdrawal from the ground, and, where the ground is crumbly or wet, to disintegrate, with portions of the plugs being left in the ground and requiring removal by means other than with the cutters. These difficulties are in part due to the fact that, as a plug is withdrawn from the ground, a vacuum is created, between the bottom of the plug and the bottom of the cut, or hole, and the surrounding earth, which tends, not only to resist withdrawal of the plug, but to cause disintegration of the plug. Heretofore, release of both cutters, and cuts made thereby, have required sidewise manipulations of the cutters, relative to the holes made in the ground, with the undesirable result that the holes achieved are out-of-round and of oversize diameters.

The primary object of the present invention is the provision, in a device of the kind indicated above, of manually operated means which acts to relieve the offending vacuum mentioned above, and to otherwise facilitate the clean and accurate cutting and the complete and easy removal of cuts made with the device; and which serves as accurate guide means for the location of holes to be made.

In the drawings:

FIGURE 1 is a side elevation of a device of the invention, partly broken away and in section, showing the vacuum breaking and guide rod in elevated position.

FIGURE 2 is a view taken from the left of FIGURE 1;

FIGURE 3 is a vertical transverse section, taken on the line 3—3 of FIGURE 2, showing the rod in depressed position; and FIGURE 4 is a bottom plan view of FIGURE 1.

Referring in detail to the drawings, the illustrated device comprises a vertically elongated tubular shaft 10, having a T 12 secured on its upper end, through which is engaged a fixed cross handle 14. The shaft 10 is fixed, at its lower end, to the top wall 16 of a hollow cup-shaped cutter head 18, having a cylindrical side wall 20, the top wall 16 being formed with a central opening 22, registered with the bore 24 of the shaft 10.

The cutter head top wall 16 is formed, with a pair of diametrically opposed, unnumbered, transverse slots, equidistant from opposite sides of the shaft 10, through which are slidably engaged, flat vertically elongated bars 28 of an ejector 30.

The ejector 30 further comprises a flat, transversely elongated horizontal pressure bar 32, wider than the shaft 10, and formed with a centered opening 33 passing the shaft 10, to which the upper ends of the bars 28 are fixed. The bars 28 are conformably engaged through the slots 26, and are fixed, at their lower ends, within the cutter head 18, to a flat horizontal circular ejector plate 34, which is adapted to be worked upwardly and downwardly within the cutter head, by manipulation of the ejector 30. As a cut is made in the ground by forcing the sharpened lower end 36 of the cutter head side wall 20 downwardly into the ground, utilizing the handle 14, the ejector 30 is forced upwardly to its elevated position, shown in FIGURES 1 to 3; and the resultant plug fills the interior of the head 18. Upon withdrawal of the head 18, from the ground, with the plug, the plug is ejected from the head, by depressing the ejector 30, by pressing downwardly, with the foot, on the pressure bar 32.

The above described hole cutter structure is substantially conventional, and is, in accordance with the present invention, supplemented by the incorporation therein of a vertically elongated rod 38, smaller in diameter than the bore of the shaft 10, and long enough to reach downwardly, through the shaft 10, of the cutter head top wall opening, and a central opening 40 in the ejector plate 34, and the cutter head 18, to put its pointed lower end 42, below the lower end 36 of the head, as shown in FIGURE 3, in the depressed position of the rod.

The rod 38 is adapted to be worked between its depressed position, and its elevated position, shown in FIGURE 1, by means of a hand lever 44, which is pivoted, intermediate its ends, as indicated at 46, on an external ear 48, fixed on a side of the shaft 10, at a location near the upper end of the shaft and spaced below the handle 14. The ear 48 is laterally offset, relative to the vertical centerline of the shaft 10, so that, as shown in FIGURE 3, the hand lever 44 works externally and crosswise of the shaft.

At its lower end, the lever 44 is connected by a lateral pivot pin 50, to the upper end of a link 52, located outside of the shaft 10. The lower end of the link 52 is pivoted, as indicated at 58, to the upper end of the rod 38, the pivot pin 58 being extended inwardly through and working in a vertically elongated slot 54, provided in the sidewall 56 of the shaft 10.

In use and operation, the exact location of a golf cup hole having been selected, the rod 38 is extended downwardly to its depressed position, by elevating the hand lever 44, so that its pointed lower end 42 extends below the cutter head 18. The pointed lower end 42 is then vertically centered relative to and pressed into the center of the hole location, in advance of the cutter head 18, so as to accurately center the cutter head relative to the location. The cutter head 18 is then depressed into the ground, so as to cut the plug, and, preliminary to withdrawing the cutter head and the plug, from the ground, the rod 38 is quickly elevated, by depressing the hand lever 44. This produces a centered vertical bore through the plug, through which trapped air or vacuum escapes, which would otherwise handicap clean removal of the plug and the cutter head from the ground. The cutter head 18 and its contained plug are then easily withdrawn from the ground.

What is claimed is:

1. A hole cutting device for forming golf holes or the like, comprising a hollow cup-shaped cutter head having an upper closure wall and a lower cutting edge, an earth-piercing member extending through the upper closure wall of the cutter head, means supporting said piercing member relative to the cutter head to move between retracted and extended positions, said piercing member having a ground entering end adapted to extend beyond said lower cutting edge of the cutter head in its extended position and adjusted to withdraw at least to the level of said upper closure wall in its retracted position, and means for retracting and extending said piercing member.

2. A device of the character described, comprising a hollow cup-shaped cutter head having an open lower end and a top wall, an upstanding shaft fixed on said top wall, a vertically elongated rod working through the cutter head top wall and extending along said shaft, said rod having a lower end, manual means on the shaft and operatively connected to the rod for moving the rod between a downwardly extended position wherein the lower end of the rod is below the lower end of the cutter head, and an upwardly retracted position wherein the lower end of the rod is substantially at the level of the top wall of the cutter head.

3. A device according to claim 2, wherein said shaft is tubular, said cutter head top wall being formed with an opening with which the shaft is aligned, said rod having a cross-section throughout its length smaller than that of the shaft and being positioned within the shaft and working through said top wall opening.

4. A device according to claim 3, said rod having a pointed lower end.

5. A device according to claim 3, wherein said manual means comprises a hand lever pivoted intermediate its ends on the shaft, the shaft having a sidewall formed with a vertical slot, pivot means on the hand lever working in said slot and operatively connected to the rod.

6. A device according to claim 5, wherein said pivot means includes a vertical link pivoted at its lower end to the rod by a pin passing through and working in said slot, said link being pivoted at its upper end to said hand lever.

7. A device according to claim 3, wherein is additionally provided an ejector having an ejector plate working within said cutter head below the top wall of the cutter head, said ejector plate being formed with an opening passing said rod, bar means fixed to said ejector plate and working through the top wall of the cutter head, and a pressure bar fixed to the upper ends of said bar means and slidably engaged with the shaft above said cutter head.

References Cited

FOREIGN PATENTS 105,272    8/1942    Sweden.
919,184    11/1946    France.

EVON C. BLUNK, *Primary Examiner.*

R. D. GUIOD, *Assistant Examiner.*